(12) United States Patent
Francisco et al.

(10) Patent No.: US 8,233,948 B2
(45) Date of Patent: Jul. 31, 2012

(54) SLIDER ASSEMBLY FOR A HOUSING OF A MOBILE COMPUTING DEVICE (75) Inventors: Michael Francisco, Fremont, CA (US); Troy Hulick, Saratoga, CA (US); Yoshimichi Matsuoka, Cupertino, CA (US); Jose Efrain Alcorta, Austin, TX (US); David Northway, San Carlos, CA (US); Troy Carter, Mountain View, CA (US); Heather Lynn Klaubert, Menlo Park, CA (US); Susanne Meissner, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1255 days.

(21) Appl. No.: 11/954,200

(22) Filed: Dec. 11, 2007

(65) Prior Publication Data
US 2009/0147471 A1    Jun. 11, 2009

(51) Int. Cl.
*H04M 1/00* (2006.01)
(52) U.S. Cl. .................. 455/575.4; 455/90.3; 455/550.1
(58) Field of Classification Search ............... 455/575.4, 455/575.1, 550.1, 90.3, 556.2; 379/433.01
See application file for complete search history.

(56) References Cited

U.S. PATENT DOCUMENTS

| 4,279,021 | A | 7/1981 | See et al. |
|---|---|---|---|
| 4,415,065 | A | 11/1983 | Sandstedt |
| 4,587,630 | A | 5/1986 | Straton et al. |
| 4,725,694 | A | 2/1988 | Auer et al. |
| 4,764,770 | A | 8/1988 | Church |
| 4,803,474 | A | 2/1989 | Kulp |
| 4,887,212 | A | 12/1989 | Zamora et al. |
| 4,892,981 | A | 1/1990 | Soloway et al. |
| 4,896,003 | A | 1/1990 | Hsieh |
| 4,916,441 | A | 4/1990 | Gombrich |
| 4,931,781 | A | 6/1990 | Miyakawa |
| 5,010,547 | A | 4/1991 | Johnson et al. |
| 5,012,219 | A | 4/1991 | Henry |
| D320,598 | S | 10/1991 | Auerbach et al. |
| 5,067,164 | A | 11/1991 | Denker et al. |

(Continued)

FOREIGN PATENT DOCUMENTS

EP         0149762        7/1986

(Continued)

OTHER PUBLICATIONS

U.S. Appl. No. 60/329,180, filed Oct. 15, 2001, Capps.

(Continued)

*Primary Examiner* — John J Lee (57) ABSTRACT

A mobile computing device is provided that includes a front housing segment and a back housing segment. The front housing segment includes a first front slot and a first front securement feature or cleat. The back housing segment includes a first back slot and a first securement feature or cleat. The front housing segment and the back housing segment are positioned so that the first back securement feature is received and slideably engaged with the first front slot, and the first front securement feature is received and slideably engaged with the first back cleat. A combination of (i) the first back securement feature being received and slideably engaged with the first front slot, and (ii) the first front securement feature being received and slideably engaged with the first back securement feature, enable the front housing segment and the back housing segment to slide along a path that includes an extended position and a contracted position. As described with one or more embodiments, the path may be arced or otherwise include a radius of curvature.

22 Claims, 6 Drawing Sheets

U.S. PATENT DOCUMENTS

| | | |
|---|---|---|
| 5,075,684 A | 12/1991 | DeLuca |
| 5,101,439 A | 3/1992 | Kiang |
| 5,109,539 A | 4/1992 | Inubushi et al. |
| D326,451 S | 5/1992 | Roegner |
| 5,218,188 A | 6/1993 | Hanson |
| 5,227,614 A | 7/1993 | Danielson et al. |
| 5,235,561 A | 8/1993 | Seager |
| 5,307,086 A | 4/1994 | Griffin et al. |
| 5,334,824 A | 8/1994 | Martinez |
| 5,335,276 A | 8/1994 | Thompson et al. |
| 5,336,001 A | 8/1994 | Lichtenberg |
| 5,345,615 A | 9/1994 | Garofalo |
| 5,357,065 A | 10/1994 | Mitamura et al. |
| 5,359,317 A | 10/1994 | Gomez et al. |
| 5,379,057 A | 1/1995 | Clough et al. |
| 5,381,387 A | 1/1995 | Blonder et al. |
| 5,392,447 A | 2/1995 | Schlack et al. |
| 5,394,140 A | 2/1995 | Wong et al. |
| 5,398,310 A | 3/1995 | Tchao et al. |
| D359,920 S | 7/1995 | Skamoto |
| 5,440,629 A | 8/1995 | Gray |
| 5,442,406 A | 8/1995 | Altmanshofer et al. |
| 5,450,619 A | 9/1995 | Maeda |
| 5,465,401 A | 11/1995 | Thompson |
| 5,494,363 A | 2/1996 | Hochgesang |
| 5,502,460 A | 3/1996 | Bowen |
| 5,503,484 A | 4/1996 | Louis |
| 5,510,808 A | 4/1996 | Cina et al. |
| 5,563,629 A | 10/1996 | Caprara |
| 5,584,054 A | 12/1996 | Tyneski et al. |
| 5,612,682 A | 3/1997 | DeLuca et al. |
| 5,619,555 A | 4/1997 | Fenton et al. |
| 5,627,978 A | 5/1997 | Altom et al. |
| 5,644,338 A | 7/1997 | Bowen |
| 5,646,402 A | 7/1997 | Khovaylo et al. |
| 5,650,776 A | 7/1997 | Mitchell et al. |
| 5,661,641 A | 8/1997 | Shindo |
| 5,705,995 A | 1/1998 | Laflin et al. |
| 5,719,936 A | 2/1998 | Hillenmayer |
| 5,742,894 A | 4/1998 | Jambhekar et al. |
| 5,745,904 A | 4/1998 | King et al. |
| 5,754,636 A | 5/1998 | Bayless et al. |
| 5,779,030 A | 7/1998 | Ikegami et al. |
| 5,797,029 A | 8/1998 | Nguyen |
| 5,797,089 A | 8/1998 | Nguyen |
| 5,797,098 A | 8/1998 | Schroeder et al. |
| 5,809,115 A | 9/1998 | Inkinen |
| 5,812,651 A | 9/1998 | Kaplan |
| 5,813,778 A | 9/1998 | Shih |
| 5,815,142 A | 9/1998 | Allard et al. |
| 5,821,881 A | 10/1998 | Fischer et al. |
| D401,577 S | 11/1998 | Yamaguchi |
| 5,848,356 A | 12/1998 | Jambhekar et al. |
| 5,860,074 A | 1/1999 | Rowe et al. |
| 5,873,108 A | 2/1999 | Goyal et al. |
| 5,889,600 A | 3/1999 | McGuire |
| 5,903,852 A | 5/1999 | Schaupp et al. |
| 5,917,905 A | 6/1999 | Whipple et al. |
| 5,917,906 A | 6/1999 | Thornton |
| 5,922,071 A | 7/1999 | Taylor et al. |
| 5,941,648 A | 8/1999 | Robinson et al. |
| 5,949,764 A | 9/1999 | Yoshida et al. |
| 5,958,006 A | 9/1999 | Eggleston et al. |
| 5,974,334 A | 10/1999 | Jones |
| D416,256 S | 11/1999 | Griffin et al. |
| 6,002,944 A | 12/1999 | Beyda |
| 6,006,109 A | 12/1999 | Shin |
| 6,009,338 A | 12/1999 | Iwata et al. |
| 6,016,142 A | 1/2000 | Chang et al. |
| 6,018,571 A | 1/2000 | Langlois et al. |
| 6,029,072 A | 2/2000 | Barber |
| 6,035,214 A | 3/2000 | Henderson |
| 6,055,439 A | 4/2000 | Helin et al. |
| 6,058,304 A | 5/2000 | Callaghan et al. |
| 6,064,734 A | 5/2000 | Hasegawa et al. |
| 6,069,648 A | 5/2000 | Suso et al. |
| 6,073,027 A | 6/2000 | Norman et al. |
| 6,084,951 A | 7/2000 | Smith et al. |
| 6,097,391 A | 8/2000 | Wilcox |
| 6,101,531 A | 8/2000 | Egglestol et al. |
| 6,111,527 A | 8/2000 | Susel |
| 6,115,248 A | 9/2000 | Canova et al. |
| 6,119,179 A | 9/2000 | Whitridge et al. |
| 6,128,475 A | 10/2000 | Wicks et al. |
| 6,133,916 A | 10/2000 | Bukszar et al. |
| 6,137,469 A | 10/2000 | Wu et al. |
| 6,157,630 A | 12/2000 | Adler et al. |
| 6,166,342 A | 12/2000 | Chou |
| 6,169,911 B1 | 1/2001 | Wagner et al. |
| 6,188,917 B1 | 2/2001 | Laureanti |
| 6,192,118 B1 | 2/2001 | Bayless et al. |
| 6,198,053 B1 | 3/2001 | Chou |
| 6,208,879 B1 | 3/2001 | Iwata et al. |
| 6,215,865 B1 | 4/2001 | McCalmont |
| 6,233,469 B1 | 5/2001 | Watanabe |
| 6,243,452 B1 | 6/2001 | O'Shaughnessey et al. |
| 6,243,595 B1 | 6/2001 | Lee et al. |
| 6,256,631 B1 | 7/2001 | Malcolm |
| 6,259,449 B1 | 7/2001 | Saxena et al. |
| 6,259,932 B1 | 7/2001 | Constein |
| 6,262,716 B1 | 7/2001 | Raasch |
| 6,278,884 B1 | 8/2001 | Kim |
| 6,295,372 B1 | 9/2001 | Hawkins et al. |
| 6,297,795 B1 | 10/2001 | Kato et al. |
| 6,297,945 B1 | 10/2001 | Yamamoto |
| 6,310,609 B1 | 10/2001 | Morgenthater |
| 6,317,313 B1 | 11/2001 | Mosgrove et al. |
| 6,317,781 B1 | 11/2001 | DeBoor et al. |
| 6,333,973 B1 | 12/2001 | Smith et al. |
| D454,349 S | 3/2002 | Makidera et al. |
| 6,370,018 B1 | 4/2002 | Miller et al. |
| D456,794 S | 5/2002 | Laverick et al. |
| 6,389,124 B1 | 5/2002 | Schnarel et al. |
| 6,397,084 B1 | 5/2002 | Wicks et al. |
| 6,405,172 B1 | 6/2002 | Baker et al. |
| 6,415,138 B2 | 7/2002 | Sirola et al. |
| 6,424,369 B1 | 7/2002 | Adair et al. |
| 6,442,263 B1 | 8/2002 | Beaton et al. |
| D462,354 S | 9/2002 | Kimbre et al. |
| 6,445,577 B1 | 9/2002 | Madsen et al. |
| 6,452,588 B2 | 9/2002 | Griffin et al. |
| D464,962 S | 10/2002 | MacGregor et al. |
| 6,462,941 B1 | 10/2002 | Hulick et al. |
| 6,466,202 B1 | 10/2002 | Suso et al. |
| 6,469,910 B2 | 10/2002 | Lefort |
| 6,483,445 B1 | 11/2002 | England |
| 6,483,697 B1 | 11/2002 | Jenks et al. |
| 6,502,090 B1 | 12/2002 | Raisanen |
| D468,714 S | 1/2003 | Maruska et al. |
| 6,512,507 B1 | 1/2003 | Furihata et al. |
| D470,842 S | 2/2003 | Bhatia et al. |
| 6,516,202 B1 | 2/2003 | Hawkins et al. |
| 6,525,715 B2 | 2/2003 | Uchiyama et al. |
| D471,559 S | 3/2003 | DeSaulles |
| 6,535,749 B1 | 3/2003 | Iwata et al. |
| D473,580 S | 4/2003 | Nakahara |
| 6,542,721 B2 | 4/2003 | Boesen |
| 6,549,194 B1 | 4/2003 | McIntyre et al. |
| 6,557,004 B1 | 4/2003 | Ben-Shachar et al. |
| 6,577,721 B1 | 6/2003 | Vainio |
| 6,577,877 B1 | 6/2003 | Charlier et al. |
| 6,583,806 B2 | 6/2003 | Ludwig et al. |
| D477,114 S | 7/2003 | Sheng |
| D477,597 S | 7/2003 | Laverick et al. |
| 6,587,700 B1 | 7/2003 | Meins et al. |
| 6,636,203 B1 | 10/2003 | Wong et al. |
| 6,636,419 B2 | 10/2003 | Duarte |
| 6,640,114 B2 | 10/2003 | Bae |
| 6,643,124 B1 | 11/2003 | Wilk |
| 6,643,529 B1 | 11/2003 | Inoue et al. |
| 6,658,272 B1 | 12/2003 | Lenchik |
| 6,661,404 B1 | 12/2003 | Sirola et al. |
| 6,665,173 B2 | 12/2003 | Brandenberg et al. |
| D488,478 S | 4/2004 | Laverick et al. |
| D490,100 S | 5/2004 | Su et al. |
| 6,748,249 B1 | 6/2004 | Eromaki et al. |
| 6,751,473 B1 | 6/2004 | Goyal et al. |

| | | |
|---|---|---|
| D494,166 S | 8/2004 | Kumagai et al. |
| 6,771,992 B1 | 8/2004 | Tomura et al. |
| 6,781,575 B1 | 8/2004 | Hawkins et al. |
| 6,792,090 B1 | 9/2004 | Kobayashi |
| 6,882,326 B2 | 4/2005 | Hirayama et al. |
| 6,898,301 B2 | 5/2005 | Iwanaga |
| 6,947,158 B1 | 9/2005 | Kitamura et al. |
| D511,342 S | 11/2005 | Chien |
| 6,961,593 B1 | 11/2005 | Lonka et al. |
| 6,973,217 B2 | 12/2005 | Bolick et al. |
| 6,976,217 B1 | 12/2005 | Vertaschitsch |
| 7,007,239 B1 | 2/2006 | Hawkins et al. |
| 7,016,182 B2 | 3/2006 | Brandenberg et al. |
| 7,058,168 B1 | 6/2006 | Knappe et al. |
| 7,069,056 B2 | 6/2006 | Iwata et al. |
| 7,069,063 B2 | 6/2006 | Halkosaari et al. |
| 7,092,747 B2 | 8/2006 | Park et al. |
| 7,155,419 B2 | 12/2006 | Blackman et al. |
| D535,281 S | 1/2007 | Yang |
| 7,181,256 B2 | 2/2007 | Hyun et al. |
| 7,187,363 B2 | 3/2007 | Nguyen et al. |
| 7,231,208 B2 | 6/2007 | Robertson et al. |
| D546,313 S | 7/2007 | Lheem |
| 7,269,450 B2 | 9/2007 | Lee et al. |
| D558,757 S | 1/2008 | Andre et al. |
| D561,159 S | 2/2008 | Heng et al. |
| D561,782 S | 2/2008 | Kim |
| D562,289 S | 2/2008 | Suk et al. |
| D563,935 S | 3/2008 | Kim et al. |
| D568,284 S | 5/2008 | Lee et al. |
| D575,259 S | 8/2008 | Kim et al. |
| 7,412,258 B1 | 8/2008 | Lipponen et al. |
| D581,390 S | 11/2008 | Ma et al. |
| D585,044 S | 1/2009 | Seo et al. |
| 7,474,298 B2 | 1/2009 | Nguyen et al. |
| D588,594 S | 3/2009 | Matsuoka |
| D590,804 S | 4/2009 | Tkachuk |
| D591,739 S | 5/2009 | Matsuoka |
| D592,628 S | 5/2009 | Kim et al. |
| D593,062 S | 5/2009 | Lee et al. |
| D594,433 S | 6/2009 | Seo et al. |
| D596,152 S | 7/2009 | Hong et al. |
| D597,507 S | 8/2009 | Jung et al. |
| D600,230 S | 9/2009 | Salmi et al. |
| D600,241 S | 9/2009 | Andre et al. |
| D600,667 S | 9/2009 | Hu et al. |
| D601,993 S | 10/2009 | Yun et al. |
| D602,014 S | 10/2009 | Andre et al. |
| D602,017 S | 10/2009 | Andre et al. |
| D602,455 S | 10/2009 | Lee et al. |
| D602,903 S | 10/2009 | Tompkin et al. |
| D603,830 S | 11/2009 | Webb et al. |
| D606,037 S | 12/2009 | Christopher et al. |
| D606,960 S | 12/2009 | Ahn et al. |
| 7,636,592 B2 | 12/2009 | Kim et al. |
| D608,228 S | 1/2010 | Miyawaki |
| 2001/0011993 A1 | 8/2001 | Saarinen |
| 2001/0034222 A1 | 10/2001 | Roustaei et al. |
| 2001/0046886 A1 | 11/2001 | Ishigaki |
| 2002/0042853 A1 | 4/2002 | Santoh et al. |
| 2002/0044136 A1 | 4/2002 | Griffin et al. |
| 2002/0044216 A1 | 4/2002 | Cha |
| 2002/0082043 A1 | 6/2002 | Wilska et al. |
| 2002/0115478 A1 | 8/2002 | Fujisawa et al. |
| 2002/0133378 A1 | 9/2002 | Mault et al. |
| 2002/0140667 A1 | 10/2002 | Horiki |
| 2002/0154745 A1 | 10/2002 | Shtivelman |
| 2002/0169924 A1 | 11/2002 | Osborn |
| 2002/0191160 A1 | 12/2002 | Chuang |
| 2003/0008679 A1 | 1/2003 | Iwata et al. |
| 2003/0034987 A1 | 2/2003 | Webb et al. |
| 2003/0064751 A1 | 4/2003 | Charlier et al. |
| 2003/0071791 A1 | 4/2003 | Hanson |
| 2003/0073414 A1 | 4/2003 | Capps |
| 2003/0090468 A1 | 5/2003 | Finke-Anlauff |
| 2003/0112225 A1 | 6/2003 | Granberg |
| 2003/0122779 A1 | 7/2003 | Martin et al. |
| 2003/0122882 A1 | 7/2003 | Kho |
| 2003/0128190 A1 | 7/2003 | Wilbrink et al. |

| | | | |
|---|---|---|---|
| 2003/0137493 A1 | 7/2003 | Chuang | |
| 2003/0228863 A1 | 12/2003 | Vander Veen et al. | |
| 2003/0228888 A1 | 12/2003 | Adamson | |
| 2004/0008827 A1 | 1/2004 | Martin et al. | |
| 2004/0023643 A1 | 2/2004 | Vander Veen et al. | |
| 2004/0026136 A1 | 2/2004 | Hill et al. | |
| 2004/0028192 A1 | 2/2004 | Pelletier | |
| 2004/0028199 A1 | 2/2004 | Carlson | |
| 2004/0039794 A1 | 2/2004 | Biby et al. | |
| 2004/0062367 A1 | 4/2004 | Fellerstein et al. | |
| 2004/0155909 A1 | 8/2004 | Wagner | |
| 2004/0157653 A1* | 8/2004 | Kato | 455/575.4 |
| 2004/0203977 A1 | 10/2004 | Kennedy | |
| 2004/0240163 A1 | 12/2004 | Adams et al. | |
| 2005/0054398 A1* | 3/2005 | Kim | 455/575.4 |
| 2005/0250563 A1* | 11/2005 | Nan | 455/575.4 |
| 2005/0267975 A1 | 12/2005 | Qureshi et al. | |
| 2006/0015819 A1 | 1/2006 | Hawkins et al. | |
| 2006/0033706 A1 | 2/2006 | Haitani et al. | |
| 2006/0121938 A1 | 6/2006 | Haitani et al. | |
| 2006/0160566 A1 | 7/2006 | Plahte et al. | |
| 2006/0161858 A1 | 7/2006 | Hawkins et al. | |
| 2006/0168539 A1 | 7/2006 | Hawkins et al. | |
| 2006/0281501 A1 | 12/2006 | Zuo et al. | |
| 2007/0146330 A1 | 6/2007 | Nguyen et al. | |
| 2007/0155427 A1 | 7/2007 | Tran | |
| 2007/0291052 A1 | 12/2007 | van der Meulen | |
| 2008/0024453 A1 | 1/2008 | Webb et al. | |
| 2009/0034172 A1 | 2/2009 | Nguyen et al. | |
| 2009/0174666 A1 | 7/2009 | Matsuoka | |
| 2009/0176542 A1 | 7/2009 | Matsuoka | |
| 2009/0186662 A1 | 7/2009 | Rak et al. | |
| 2009/0305742 A1 | 12/2009 | Caballero et al. | |

FOREIGN PATENT DOCUMENTS

| | | |
|---|---|---|
| EP | 0704788 | 4/1996 |
| EP | 1051012 | 11/2000 |
| EP | 1107101 | 6/2001 |
| EP | 1220517 | 7/2002 |
| FR | 2760933 | 9/1998 |
| GB | 2289595 | 11/1995 |
| JP | 2001024762 | 1/2001 |
| KR | 10-2002-14107 A | 2/2002 |
| KR | 10-2003-90549 A | 11/2003 |
| KR | 20-0355890 Y1 | 7/2004 |
| KR | 20-0384472 Y1 | 5/2005 |
| KR | 20-0389749 Y1 | 7/2005 |
| WO | WO99/08238 | 2/1999 |
| WO | WO01/13605 | 2/2001 |

OTHER PUBLICATIONS

Final Office Action mailed Jun. 4, 2010 in U.S. Appl. No. 11/611,830.
"3GPP2 Multimedia Messaging System—MMS Specification Overview—Revision: A. Mobile Messaging", May 2003, [online] [Retrieved on Dec. 10, 2004] Retrieved from the internet: URL: http://www.lebodic.net/left.htm.
"An Introduction to Mobile Messaging," Mobile Messaging, May 2003, [online] [Retrieved on Dec. 10, 2004] Retrieved from the Internet: URL: http://www.lebodic.netlintro.htm.
"At Last, Technology Harnesse [sic] One of the Most Powerf [sic] Forces know to Men.", Go Corporation, 14 pages, Foster City, (1991).
"AT&T New Release, NCR Cuts Price of 3170 Notebook Computer 11 to 19 Percent", 2 pages [online], retrieved from the Internet: URL: http://www.att.com/press/0393/930308.nca.html., (Mar. 8, 1993).
"Definition of Handheld Computer", printed from thte website: http://dictionary.reference.com, dated Feb. 11, 2004 (3 pgs).
"Definition of Handheld", printed from thte website: http://searchmobilecomputing.techtarget.com, dated Feb. 11, 2004 (3 pgs).
"Excerpts from Ericsson Mobile Phone 1888 World User's Guide", Copyright 1998 Ericsson Mobile Communications AB.
"Handheld" Game Console - Wikipedia, the free encyclopedia, [online] [Retrieved on Oct. 13, 2006], Retrieved from the Internet: URL: http://en.wikipedia.org/wjkwHandheld_game_console.
"IBM Selects Racotek Datalloice Communications Services to Interface with Touchmobile Product", PR Newswire, Jan. 26, 1993, 2 pages.

"IBM Touchmobile Information and Planning Guide", International Business Machines Incorporated, Mar. 1993, 20 pages.

"IBM TouchMobile Solution for Data Capture and Communication, Keeping Your Business Moving in the 90's, International Business Machines Incorporated, Jan. 1993, 13 pages."

"IBM's Touchmobile Helps Field Workers Collect Data at the Touch of a Finger", PR Newswire, Jan. 26, H1993, 1 page.

"Nokia, Frequently Asked Questions", http://www.nokia.com.in/nokiaapac/india/faqs_list/0,18778,39_41,00.html. Nov. 17, 2003.

"PCT Notification of Transmittal of International Preliminary Examination Report", PCT/US2000/22182, (Oct. 26, 2001), 6 pages.

"Printout of various website pages from biz.yahoo.com article "Conference Calling Added to BestNet's Service Designed for Palm OS(R) Handhelds"—Tuesday, Aug. 21, 2001".

"The Handheld Computing Industry—2000", Stanford Technology Ventures Program (STVP), (Jan. 13, 2001), pp. 1-38.

Agrawal, P. et al., "Get Wireless: A Mobile Technology Spectrum", IT PRO, IEEE, (Jul./Aug. 1999), 18-23.

American Programmer, American Programmer, Inc., NY, (Dec. 1991), 4-33.

Caar, R.M. "The Point of the Pen". Byte, Reprinted, Feb. 1991, 10 pages.

Chan, E. et al., "Personal Digital Assistants & Wireless Convergence", MGMT 557 Strategic Management of Innovation, (May 4, 2000), 1-28.

Communication pursuant to Article 96(2) EPC, European Patent Office, Application No. 02 766 017.4-1527, Aug. 2, 2007, 8 pages.

Communications Solutions™ TMC Labs Test Drive, Mar. 2000, Retrieved from the Internet: URL: https://www.tmcnet.com/articles/comsol/0300/0300labs1.htm.

Cowart, T.,Mastering Windows 95—The Windows 95 Bible, (1995), 110-117, 352-359, SyBex, USA.

Cullen, A. "Connecting with Your EO Cellular Module", EO, Inc. Mountain View., (1992, 1993), ii-33.

Cullen, A. "Getting Started with Your EO Personal Communicator", EO, Inc. Mountain View., (1992, 1993), ii-74.

Cullen, A. "Lookup Guide to the EO Personal Communicator", EO, Inc. Mountain View., (1992, 1993), ii-320.

Dyszel, B., "Handspring Visor for Dummies", IDG Books Worldwide, Inc, (2000), o. 13, 15, 121, 122, 123, 208.

Excerpts from Handspring VisorPhone™ User's Guide, Copyright 2000 Handspring, Inc.

Excerpts from Motorola Timeport Tri-Band Mobile Telephone Manual, Copyright 1999 Motorola, Inc.

Final Office Action mailed Mar. 13, 2006, for US 2003/0034987, 10 pages.

GO Corporation Information Statement, 218 pages, (Nov. 8, 1993).

Hewlet Packard, Products and Services, http://www.hp.com/, Nov. 11, 2001.

Ikeya, B. "Detailed Overview of the PC Card Standard, PCMCIA", http://www.pcmcia.org/pccarcJstandard.htm., (1998).

International Search Report and Written Opinion of the International Searching Authority in International Application PCT/US2002/26197, ISA/US, Dec. 13, 2002, 4pgs.

Introduction to PCMCIA Technical Tutorial, Dec. 6, 2002. pp. 1-11.

Kanellos, M. "Qualcomm Merges Phone, Handheld", CNET News.com, Sep. 21, 1998 http://www.news.com/Qualcomm+merges+phone%2C+handheld/2100-1001_3-215791.html.

MacNeill, D. "Messaging Card and NewtonMail: We Pick Up and Deliver", On The Go Magazine, http://www.pencomputing.com/Newton/NewtonNotes2.html, 2 pages.

MacNeill, D. "Wireless Newton Technology Goes to Work", On The Go Magazine, Oct. 13, 1993, http://www.pencomputing.com/Newton/NewtonNotes2.html, 2 pages.

Maki, K. "The AT&T EO Travel Guide", John Wiley & Sons, Inc., N.Y. 1993, iii-555.

Microsoft Microsoft Windows & MS_DOS User's Guide, (1993), p. 19, 26.

Microsoft® Windows Version 5.1, copyright 2001 (hereinafter "Windows") (screenshots 1-8).

Nokia Introduces Mobile Chat With Nokia 3310, http://www.mobiletechnews.com/info/2000/09/01/1_42022.htm, (Sep. 1, 2000).

Non-Final Office Action dated Apr. 27, 2009 in U.S. Appl. No. 09/932,213, 18 pgs.

Notification of Transmittal of International Search Report and Written Opinion, International Search Report, and Written Opinion mailed Jul. 27, 2009 in International Application No. PCT/US2008/086487, 14 pages.

PCT International Search Report, PCT/US2000/22182, (Jan. 10, 2001), 8 pages.

PCT International Search Report, Publication WO 01/13605 A3, (Feb. 22, 2001).

pdQ™ Basics Handbook, Qualcomm Incorporated., (1998, 1999), 96 pages.

Plumley, B., "Ten Minute Guide to Windows NT Workstation 4.O", Que, (Aug. 1996).

Powell, E. "Kyocera pdQ Smartphone—Brief Article—Product Announcement", http://www.findarticles.com/plartjdes/mjmOFAUTis917/ai65650619/print., (2000).

Printout of various website pages from www.bestnetcall.com regarding pdaCall (patent pending), printed Aug. 21, 2001.

Qualcomm pdQ™ 1900 Digital Pcts SmartPhone, Qualcomm Incorporated, (1999), 2 pages.

Schlender, B. R., "Hot New PCs That Read Your Writing", Fortune, Reprinted, (Feb. 11, 1991),6 pages.

Shah, R. "The Qualcomm pdQ: Kill Two Birds with One Phone", CNN.com, http://archives.cnn.com/i999rrECHJptechJi2/o3/qualcom.pdq, (Dec. 3, 1999).

Stock, R. "The World of Messaging an Introduction to Personal Communications", EO, Inc., Mountain View, (1992, 1993), p. ii-69.

Supplemental European Search Report dated Apr. 24, 2007 in PCT/US02/26197, European Patent Office, 3 pages.

T-Mobile Products; Handhelds, http://www.tmobile.com, (Sep. 28, 2002), 2 pages.

T-Mobile Products; Sidekick, http://www.tmobile.com, (Sep. 28, 2002), 3 pages.

Toshiba Computer Systems Group, http://www.toshiba.com (May 28, 2002), 1 page.

Toshiba Computer Systems Group: Pocket PC e570 http://www.pda.toshiba.com (Jul. 7, 2001), 2 pages.

* cited by examiner

SLIDER ASSEMBLY FOR A HOUSING OF A MOBILE COMPUTING DEVICE

TECHNICAL FIELD

The disclosed embodiments relate generally to the field of mobile computing devices. In particular, embodiments described herein provide for a slider assembly for a housing of a mobile computing device.

BACKGROUND

Over the last several years, the growth of cell phones and messaging devices has increased the need for keypads and button/key sets that are small and tightly spaced. In particular, small form-factor keyboards, including QWERTY layouts, have become smaller and more tightly spaced. With decreasing overall size, there has been greater focus on efforts to provide functionality and input mechanisms more effectively on the housings.

In addition to a keyboard, mobile computing devices and other electronic devices typically incorporate numerous buttons to perform specific functions. These buttons may be dedicated to launching applications, short cuts, or special tasks such as answering or dropping phone calls. The configuration, orientation and positioning of such buttons is often a matter of concern, particularly when devices are smaller.

At the same time, there has been added focus to how displays are presented, particularly with the increase resolution and power made available under improved technology. Moreover, form factor consideration such as slimness and appearance are important in marketing a device.

Production of mobile computing devices is made more difficult in the fact that conventional devices use many parts or components. The housing for a typical conventional mobile computing device typically includes a top shell, a back shell, and a midframe. The components that comprise the contents of the housing, such as printed circuit boards and display assemblies, normally require additional assembly steps. Many devices include additional housing features that are provided on the device separately. The result is that the devices often have numerous interconnected components. In the case of the housing, the numerous components yield devices that are less durable and more difficult to assemble.

In order to increase the features and functionality on a computing device, many mobile computing devices employ a sliding construction between two segments of the housing. Typically, in a sliding construction, the housing a computing device is separated into two distinct parts that are coupled to one another to slide. The parts of the housing can be extended or contracted, to reveal functionality and/or adjust the overall size of the computing device.

DETAILED DESCRIPTION

Embodiments described herein provide for a mobile computing device that includes a housing assembly having a front segment and a back segment. The front and the back housing segments are slideably coupled using a slider assembly that is integrated into a thickness of each housing segment. The slider assembly enables the front and back housing segments to be moved between at least one extended position and a contracted position. Among other benefits, a slider assembly such as described is durable against forces that a user may apply that are not in the direction of the slide motion that the assembly permits.

According to an embodiment, the motion of the front and back housing segments is arced. In one embodiment, the front and back housing segments may be slid along an arc between a contracted and extended position. When the motion between housing segments includes an arc, the possibility of the user mishandling the housing segments and applying forces that are against the natural motion of the housing segments is increased. Embodiments described herein include various features to strengthen and enhance the durability of a slider assembly in such an implementation.

Still further, embodiments described herein include a slider assembly that is durable, particular to mishandling by the user, while at the same time enhancing the tactile feel of housing segments moving between an extended and contracted position. In particular, one or more embodiments provide a slider assembly that includes or is provided with a biasing mechanism that biases the housing segments towards being in only an extended position or in a contracted position.

According to an embodiment, a mobile computing device is provided that includes a front housing segment and a back housing segment. The front housing segment includes a first front slot and a first front securement feature or cleat. The back housing segment includes a first back slot and a first securement feature or cleat. The front housing segment and the back housing segment are positioned so that the first back securement feature is received and slideably engaged with the first front slot, and the first front securement feature is received and slideably engaged with the first back cleat. A combination of (i) the first back securement feature being received and slideably engaged with the first front slot, and (ii) the first front securement feature being received and slideably engaged with the first back securement feature, enable the front housing segment and the back housing segment to slide along a path that includes an extended position and a contracted position. As described with one or more embodiments, the path may be arced or otherwise include a radius of curvature.

According to another embodiment, a slider assembly is provided for a computing device housing. The slider assembly includes a front plate and a back plate. The front plate includes at least a first front slot and at least a first front securement feature that extends from the front plate. The back plate is slideably coupled to the front plate by including (i) at least a first back slot that receives and is slideably engaged with the first front securement features of the front plate, and (ii) at least a first back securement feature that is received and slideably engaged with the first front slot of the front plate. The front plate is structured to integrate within a front housing segment of the computing device, and the back plate is structured to integrate within a back housing of the computing device, so that the front housing segment and the back housing segment are slideably coupled to one another by the front plate and the back plate.

As used herein, directional terms such as 'front' and 'back' are meant to be interpreted as being referenced to the general direction of view by a user when normally using a device being described. Thus, the 'front housing segment' of the device is the housing segment that is most near to the user when the user normally operates a computing device being described.

Device Overview

Figure 1A:
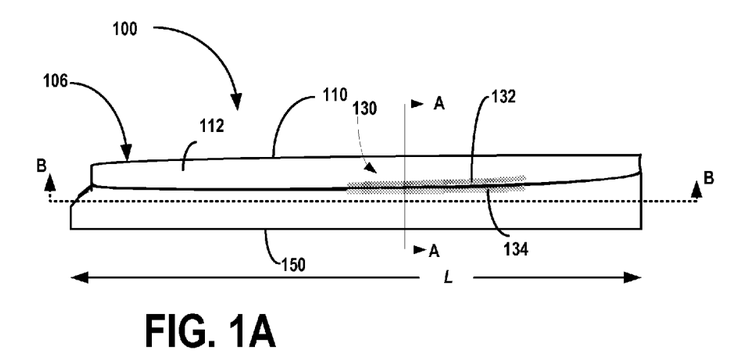
FIG. 1A is a side view of a mobile computing device that utilizes a slider assembly and includes housing segments that can be moved relative to one another from between an extended position and a contracted position, the housing being shown in the contracted position, under an embodiment of the invention.
Figure 1B:
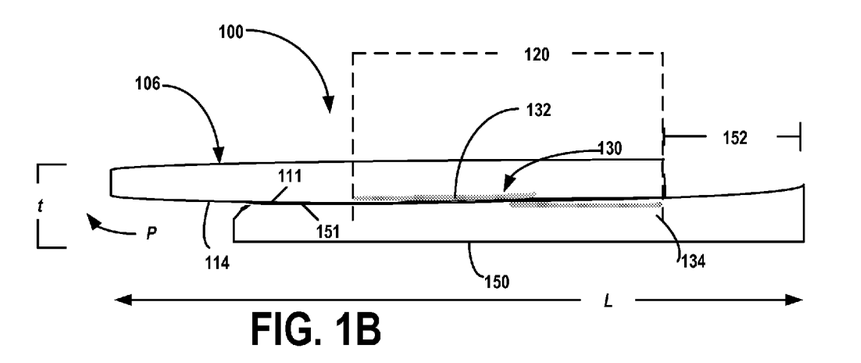
FIG. 1B is a side view of the mobile computing device of FIG. 1A under an embodiment, the housing being shown in the extended position.

FIG. 1A is a side view of a mobile computing device that utilizes a slider assembly and includes housing segments that can be moved relative to one another from between an extended position and a contracted position, with the housing being shown in the contracted position, under an embodiment. With reference to FIG. 1, a device 100 includes a housing assembly 106 that is formed from a front housing segment 110 and a back housing segment 150. The front and back housing segments 110, 150 are coupled to enable the segments to be moved relative to one another form the contracted position (as shown by FIG. 1A) into the extended position (FIG. 1B). By moving between extended and contracted positions, an overall length L of the device 100 may be maximized (extended position, shown in FIG. 1B) or minimized (contracted position, shown in FIG. 1A).

The device 100 may correspond to a cellular telephony/data devices, capable of enabling voice/telephony communications, messaging services (e.g. email, Short Message Service (SMS), Multimedia Message Service (MMS), Instant Messaging) and/or other functionality such as media playback, Global Positioning System (GPS) functionality, wireless fidelity (WiFi) or Internet access, and image/video capture. As such, the device 100 may be relatively small, such as in the form of a handheld device.

Each housing segment 100, 150 may carry functionality and/or devices. In one implementation, the front housing segment 110 may provide a display interface (not shown) that is touch-sensitive and/or includes various user-interface features. These may include buttons, multi-way mechanical features, 'soft' features (such as touch-sensitive surfaces with or without computer-generated graphics) or switches. The back housing segment 150 may carry a keypad or keyboard or other functionality that is exposed when the computing device 100 is in the extended position (FIG. 1B).

In an embodiment, an overall form factor of housing assembly 106 provides an outward contour on one or both of the housing segments. In one embodiment, the front housing segment 110 includes an exterior surface 112 that includes a display area (not shown). The exterior surface 112 may be smooth or beveless. As will be described, one embodiment provides that the front and back housing segments 110, 150 may be moved apart along a curved or other wise non-linear path P. Specifically, the front housing segment 110 may be moved along an arc in order to place the device 100 in the extended position (as shown by FIG. 1B).

FIG. 1B is a side view of the mobile computing device of FIG. 1A, with the housing segments 110, 150 being positioned so that the device 100 is in the extended position. In an extended position, a region 152 of the back housing segment 150 is exposed. Thus, for example, a keypad or other component or functionality may be made selectively accessible on the exposed region 152. The keypad or feature may be accessible for use when the front and back housing segments 110, 150 are separated into the extended position. Likewise, in the extended position, a back panel 114 of the front housing segment 110 is exposed. The surface may be used to provide functionality, a mirror or maintained featureless and smooth.

In order to enhance aesthetics and potentially maximize features that can be provided on respective surfaces of exposed region 152 and back panel 114, an embodiment provides for use of a slider assembly 130 that is shared amongst the top and the back housing segments 110, 150 and completely contained within a constantly overlapped section 120 of the housing assembly 106. The overlapped section 120 refers to a region of the interface between the front and back housing segments 110, 150 that are never exposed. The slider assembly may be positioned to operate in the interface region, which in an implementation shown, corresponds to a top boundary 151 of the back housing segment 150 and a back boundary 111 of the front housing segment 110. In an embodiment, the slider assembly 130 is not exposed on the interface region when the housing segments are in the extended position. By maintaining the slider assembly 130 completely within the overlapped section 120, the back panel 114 (when exposed), may for example, contain no visible structures that are required to enable the slider motion. For example, recesses, grooves, or sliding engagement structures may not be visible on the back panel 114, nor on any other surface that is exposable on the device 100.

Embodiments described herein provide for a slider assembly 130 that enables the front and back housing segments 110, 150 to be slid to and from the extended or contracted positions. The slider assembly 130 may be provided with low profile or thickness, to reduce an overall thickness dimension t of the device 100. In order to achieve such low profile, an embodiment provides that the slider assembly 130 is provided by structures that that occupy an integrated layer 132, 134 with each of the front and back housing segments 110, 150. In particular, the integrated layers 132, 134 may occupy a surface or depth thickness on or within the respective housing segments. Each integrated layer 132, 134 may occupy a thickness that is within and/or at the boundary of the corresponding housing segment, where that housing segment overlaps with the other housing segment to slide or move in one direction or the other. While the structures being described may be at a boundary or interface of one housing segment with respect to another, the structures are not lateral perimeter features, such as would be provided by a telescoping slider construction.

In one embodiment, the integrated layer 132 of the front housing segment 110 includes a front structure that (i) includes a slot or other receiving feature for receiving a mechanical mating structure from the back structure that is integrated into the thickness of the back segment 150, and (ii) extends one or more structures into corresponding slots or other receiving features on the structure of the back segment 150. Likewise, the integrated layer 134 of the back housing segment 110 includes a back structure that (i) includes a slot or other receiving feature for receiving a mechanical mating structure from the front structure that is integrated into the thickness of the front housing segment 110, and (ii) extends one or more structures into corresponding receiver structures on the integrated layer 132 of the back segment 110. The features of the integrated layers for providing the couplings described may be provided in mid-sections that are apart from the perimeter or lateral edges of the housing segments. In particular, the slider assembly 130 may be provided as a distributed but integral part of a slide interface formed by the back boundary 111 of the front housing segment 110 and the front boundary 151 of back housing segment 150

The structures of each integrated layer 132, 134 may be provided at or adjacent to the boundary or surface of that housing segment. The structures may be a unitarily formed feature of the respective housing segments. Alternatively, the structures may correspond to a secured or connected element. In an embodiment such as described with FIG. 2A-FIG. 2C, for example, the structures may be provided by metal plates that secure into the housing segments and provide, or are positioned adjacent to the interface with the other housing segment.

According to an embodiment, the structures that are provided within the integrated layer 132, 134 of each of the front and back housing segments 110, 150 includes a combination of slots (see FIG. 2A-FIG. 2C) and securement features (see FIG. 2A-FIG. 2C), or other similar protrusions or structures which are received by the slots. The securement features are able to travel within boundaries defined by slots, in order to enable the front and back housing segments 110, 150 to be moved between the extended and contracted positions.

Slider Assembly

Figure 2A:
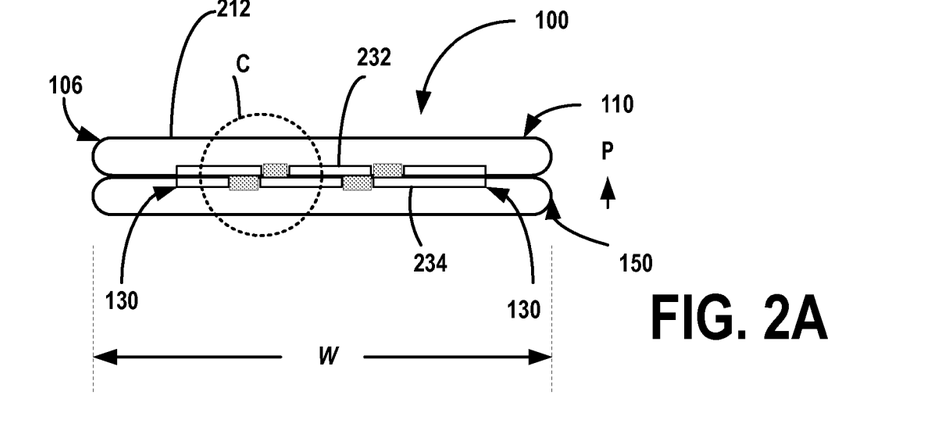
FIG. 2A is a cross-sectional view of the mobile computing device shown with a slider assembly as viewed by a perspective of lines A-A in FIG. 1A, under an embodiment of the invention.

FIG. 2A is a side cross-sectional view of the mobile computing device 100 shown with a slider assembly as viewed by a perspective of lines A-A in FIG. 1A, under an embodiment of the invention. As shown, the front and back housing segments 110, 150 are maintained closely together, but the two segments are at least partially separable in the direction of the length of the device to enable a sliding motion. The close proximity of the front and back housing segments 110, 150 enables use of a slider assembly 130 such as described with embodiments provided herein. In an embodiment, the slider assembly 130 includes features provided on the integrated layers 132, 134 of each segment that enable sliding motion amongst the two connected segments. As shown by the path of motion P, the sliding motion may be arced or otherwise include a positive radius of curvature.

As housing segments, each of the front and back housing segments 110, 150 retain internal electrical components of the device 100. The components include, for example, processors, memory components, interconnect elements, a printed circuit board, internal elements of a keypad of keyboard, a Liquid Crystal Display (LCD) of a display assembly, speakers or other audio equipment, wireless transmitters for different types of wireless communication mediums (e.g. Wireless Fidelity or WiFi, Bluetooth, WiMax cellular) and numerous other components. In one embodiment, one of the top or back housing segments 110, 150 is primary, in that it includes most of the internal components. For example, under one implementation, the front housing segment 110 may retain the display assembly and the processors and memory, while the back housing segment 150 retains the keypad, and the battery for the device 100. Connectors or accessory interfaces may be provided on either housing segment. A flex cable or other interconnect mechanism may be used to electrically couple the components of one housing segment to the other. For example, the keypad and battery in the back housing segment 150 may be electrically interconnected to a PCB retained in the front housing segment 110 through a flex cable.

Figure 2B:
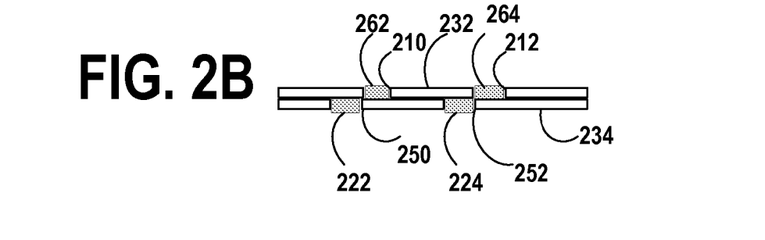
FIG. 2B illustrates the slider assembly shown in FIG. 2A, as separated from the housing, under an embodiment of the invention.

FIG. 2B illustrates the slider assembly 130 separated from the housing assembly 106, under an embodiment. In an embodiment, the slider assembly 130 includes a front plate 232 and a back plate 234, each of which provide or form part of the respective integrated layer 132, 134 (FIG. 1A and FIG. 1B). The front plate 232 may be secured or otherwise integrated with the back surface 111 (FIG. 2A) of the front housing segment 110. Likewise, the back plate 234 may be secured or otherwise integrated with a top surface 151 (FIG. 2A) of the back housing segment 150.

In an embodiment, each plate 232, 234 includes duplicate sliding retention features to retain the two housing segments 110, 150 connected to one another. In one embodiment, the front plate 232 includes a pair of the slots 210, 212 which are formed in the plate to extend in a lengthwise or longitudinal direction (i.e. in axis of L) of the device 100. Likewise, the back plate 234 includes slots 250, 252 which also extend in the longitudinal direction. Each slot 210, 212 of the front plate 232 may be used to receive a securement feature 262, 264 that is integrated or otherwise secured to the back plate 234. Each slot 250, 252 of the back plate 234 may be used to receive a securement feature 222, 224 that is integrated or otherwise secured to the front plate 232. The combination of the slot 210 of the front plate 232 and the securement feature 262 of the back plate 234 provide a first sliding coupling between the front and back housing segments 110, 150. In an embodiment shown, three additional sliding couplings may be formed by the combinations of (i) the slot 212 of the front plate 232 and the securement feature 264 of the back plate, (ii) the slot 250 of the back plate 234 and the securement feature 222 of the front plate 232, and (iii) the slot 252 of the back plate 234 and the securement feature 224 of the front plate 232.

Figure 2C:
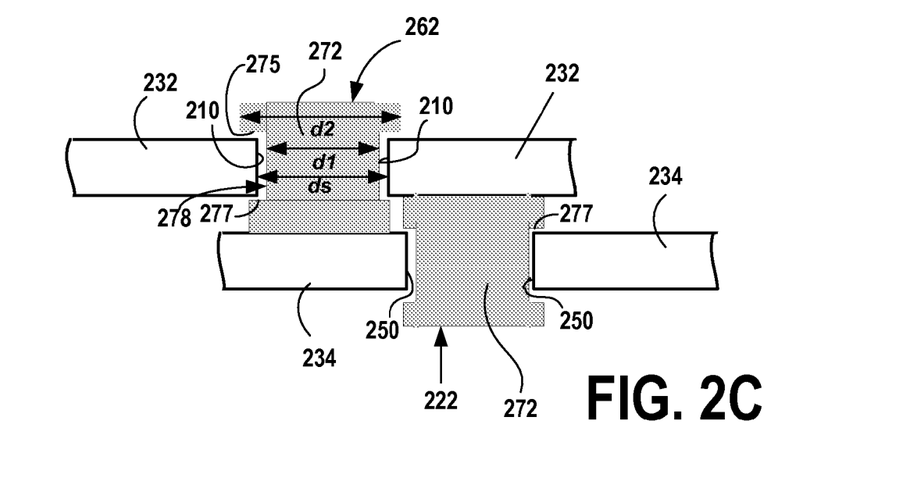
FIG. 2C is a close-up of the slider assembly of FIG. 2A, under an embodiment of the invention.
Figures 4A, 4B, 5B:
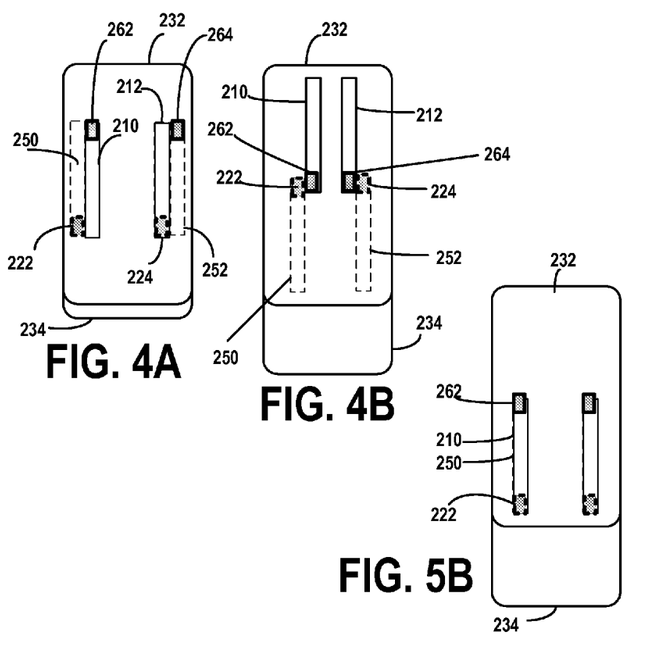
FIG. 4A and FIG. 4B illustrate an alternative coupling configuration for use on a slider assembly, under an embodiment.
FIG. 5A and FIG. 5B illustrate another coupling configuration for a slider assembly, under an embodiment.
Figure 5A:
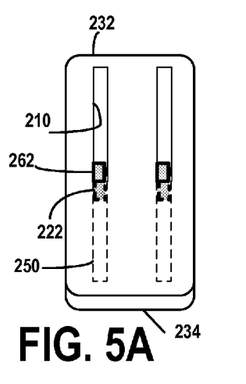

In an embodiment shown by FIG. 2A-FIG. 2C, the positioning of the couplings along the width W (FIG. 2A) of the plates 232, 234 may be staggered. In another embodiment such as shown by FIGS. 5A and 5B, the couplings may be overlaid on one another and/or aligned end-to-end, or a combination thereof. In one arrangement shown, the couplings that correspond to those formed with slots 250, 252 of the back housing segment 150 are provided towards the perimeter of the cross-section shown, while the couplings that correspond to those formed with slots 210, 212 that are provided with the front housing segment 110 are provided more towards the interior.

Among other benefits, the use of four such couplings enables a sliding engagement between the front and back housing segments 110, 150 which is durable and also a guard against overuse or mishandling by the user. Mishandling may occur when a user pulls on one housing segment axially (i.e. along axis Z), so as to pull the segments apart in a direction that is not consistent with the sliding motion. The potential for such misuse is heightened as a result of an embodiment in which the path P is arced. The use of multiple couplings that are shared between the front and back housing segments 110, 150 facilitates handling of forces that may arise from the pulling apart or other mishandling of the housing segments 110, 150.

FIG. 2C is a close-up of the slider assembly of FIG. 2A, as indicated by region C of FIG. 2A, according to an embodiment. In the region shown, the securement feature 262 of the back plate 234 is engaged into the slot 210 of the front plate 232, and the securement feature 222 of the front plate 232 is secured into the slot 250 of the back plate 234. Each securement feature 222, 262 may be provided as a mechanical extension from the respective plate 232, 234. In one implementation, the securement features 222, 262 are cleats fastened to the respective plates. In another implementation, for example, the securement features 222, 264 are unitarily formed extensions or protrusions.

Each securement feature 222, 262 may include a body 272 that includes a retention feature. In one embodiment, the retention feature may be defined by top wall 275 and back wall 277 that define a vertical opening 278. The dimension of the vertical opening 278 is greater than a thickness of the plate 232, 234, so that the entire securement feature 222, 262 can slide in the corresponding slot 210, 250. In particular, a cross-dimension d1 of the body 272 at where the vertical opening 278 is formed on each side may be just smaller than the cross-dimension ds of the corresponding slot so as to enable the securement feature to be retained and moved within the slot. A cross-dimension d2 of the body 272 at where either the top wall 275 or back wall 277 are formed may be greater than the overall cross-dimension ds of the corresponding slot, so to enable retention of the coupling.

Figures 3A, 3B:
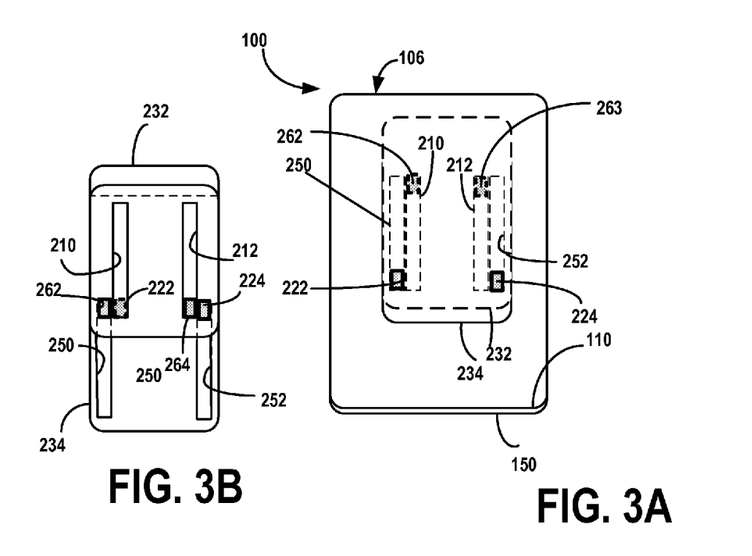
FIG. 3A is a front cross-sectional view of the mobile computing device of FIG. 1A along lines B-B, showing the housing of and slider assembly of the mobile computing device being positioned in a contracted position, under an embodiment of the invention.
FIG. 3B is a frontal view of the slider assembly of FIG. 3A, showing the plates of the slider assembly being positioned in an extended position, under an embodiment of the invention.

FIG. 3A is a front sectional view of the mobile computing device of FIG. 1A along lines B-B, showing the housing of the mobile computing device being positioned in a contracted position, under an embodiment of the invention. The front and back plates 232, 234 may be aligned and engaged within the housing assembly 106 of the device 100. As described above, one embodiment provides for use of four couplings. The couplings include slots 210, 212 of the front plate 232 and the slots 250, 252 of the back plate 234, as well as securement features 222, 224 of the front plate and securement features 262, 264 of the back plate. The couplings provided on plates 232, 234 combine to enable each housing segment 110, 150 to be moved between the extended and contracted positions.

FIG. 3B is a frontal view of the mobile computing device of FIG. 1B, showing the housing of the mobile computing device being positioned in an extended position, under an embodiment. In FIG. 3B, the front plate 232 and back plate 234 are shown removed from the housing, with the two plates being aligned so that the housing is in the extended position. The securement features 222, 224 of the front plate 232 extend inward to engage the slots 250, 252 of the back plate 234. The securement features 262, 264 of the back plate 234 extend to engage the slots 210, 212 of the front plate 232. When the housing segments are moved into the extended position, the securement features 262, 264 of the back panel 234 move downward in the slots 210, 212 of the front housing segment 232.

In a configuration of an embodiment shown by FIG. 3A and FIG. 3B, the slots 252, 254 of the back plate 234 are positioned outward, and the slots 210, 212 of the front plate 232 are positioned inward. Moreover, in an implementation shown, the plates 232, 234 in the contracted position retain the slots 210, 212 of the front plate 232 and slots 250, 252 of the back plate 234 in a side-to-side manner. The back plate 234 is moved relative to the front plate 232, so that securement features 262, 264 from the back plate 234 are (i) at the top end of the slots 210, 212 of the front plate 232 when the plates are in the contracted position, and (ii) at the back end of the slots 210, 212 when the plates are in the extended position. Thus, in the extended position, the slots 250, 252 of the back plate 234 are positioned end-on-end and to the side of the corresponding slots 210, 212 of the front plate 232.

As a variation to any of the embodiments of FIG. 3A and FIG. 3B, some or all of the lateral positioning of the slots 210, 212 of the front plate 232 and slots 250, 252 of the back plate may be reversed. For example, the slots 210, 212 of the front plate 232 may be outwardly positioned with respect to the slots 250, 252 of the back plate 234.

Various configurations may be implemented for the combination of the slots and securement features that form the sliding couplings between the housing segments 110, 150. FIG. 4A (extended position) and FIG. 4B (contracted position) show an alternative side-by-side configuration for the slots of the respective front and back plates 232, 234. More specifically, each of the slots 250, 252 of the back plate 234 may be provided adjacent to the slots 210, 212 of the front plate 232, as provided with an embodiment of FIG. 3A and FIG. 3B. However, in contrast to an embodiment of FIG. 3A and FIG. 3B, FIG. 4A shows the slots 250, 252 of the back plate 234 are also aligned end-on-end with respect to the slots 210, 212 of the front plate 232 when the two plates are in the extended position. FIG. 4B shows that slots 250, 252 are moved upwards towards a side-by-side position with corresponding slots 210, 212 of the front plate 232 when the two plates are in the contracted position.

FIG. 5A and FIG. 5B shows a slot overlay configuration for when the plates are combined to move between the extended and contracted positions. FIG. 5A shows the front plate 232 and the back plate 234 in the contracted position, with the slot 210 of the front plate being aligned with the slot 250 of the back plate in an end-on-end fashion. When end-on-end, the securement feature 262 of the back plate 234 is received and engaged at a bottom end of the slot 210 of the front plate 232, and the securement feature 222 is received and engaged at a top end of the slot 250 of the back plate 234. FIG. 5B shows the front plate 232 and the back plate 234 in the extended position. In the extended position, the slot 250 of the back plate is moved to at least partially overlay the slot 210. When overlaid, the securement feature 262 of the back plate 234 is received and engaged at a top end of the slot 210 of the front plate 232, and the securement feature 222 of the front plate is received and engaged at a bottom end of the slot 250 of the back plate 234. Other couplings formed by other combinations of slots and securement features may optionally provided the same configuration.

Still further, other couplings that use, for example, slot and securement configurations, may combine any of the implementations shown in FIG. 3A-3B, FIG. 4A-FIG. 4B and FIG. 5A-5B and other variations thereof.

Biasing Mechanism

According to one or more embodiments, a slider assembly of a computing device, such as provided by any embodiment described herein, may employ a biasing mechanism to enhance the usability and feel of the housing segments. In particular, a biasing mechanism may be employed to bias the housing segments 110, 150 (FIG. 1A and FIG. 1B) to remain in one or both of the contracted or extended positions. According to one embodiment, such a biasing mechanism would promote use of the device in only one of the two positions, rather than an intermediary position. Thus, for example, in the case where a user wishes to have access to the exposed region 152 (such as in the case where the user wishes to operate a keypad provided thereon), the user provides sufficient force to overcome the bias of the two housing segments to remain in the contracted position. Once sufficient force is applied, an embodiment provides that the housing segments (FIG. 1A and FIG. 1B) are biased into moving into the extended position. In one embodiment, the two housing segments travel between contracted position and extended position without ability to stop between. For example, only significant obstruction can prevent the device from moving into one of the contracted or extended positions (from the other of the position) once the movement into that position has been initiated.

Figure 6A:
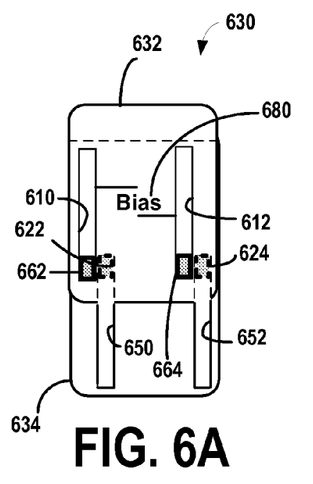
FIG. 6A and FIG. 6B illustrate a slider assembly that incorporates a biasing mechanism, according to an embodiment.
Figure 6B:
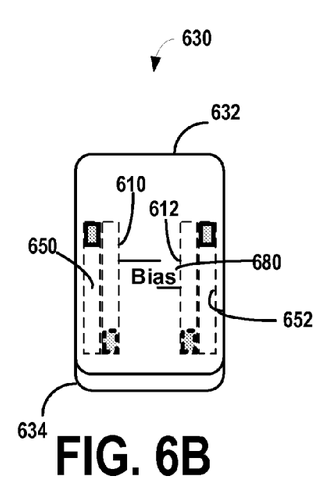

FIG. 6A and FIG. 6B illustrate the use of a biasing mechanism that serves to bias a sliding assembly into a given position, according to an embodiment. The housing of the computing device may include a slider assembly 630 comprising the front and back plates 632, 634. As with, for example, an embodiment of FIG. 3A and FIG. 3B, front and back plates 632, 634 may be aligned and engaged within the housing of the device. A biasing mechanism 680 may be coupled to both the front plate 632 and the back plate 634 to bias and relax with movement of the plates relative to one another. In one embodiment, the biasing mechanism 680 corresponds to a spring which may be formed from a combination of twisted or shaped elements, such as metal twisted into a given pattern.

As described above, one embodiment provides for use of four couplings. The couplings may be formed using the slots 610, 612 of the front plate 632 and the slots 650, 652 of the back plate 634, as well as securement features 622, 624 of the front plate 632 and securement features 662, 664 of the back plate. The couplings provided on plates 632, 634 combine to enable each housing segment to be moved between the extended and contracted positions. Any of the configurations shown and described elsewhere (including with FIG. 3A and FIG. 3B, FIG. 4A and FIG. 4B, and FIG. 5A and FIG. 5B), as well as variations thereof, may be implemented using a biasing mechanism such as shown and described.

According to an embodiment, biasing mechanism 680 is biased against enabling the plates to change position when the plates are in each of the contracted and extended position. In this regard, the biasing mechanism 680 may be selected to be bi-stable, in that biasing mechanism 680 tends to allow the plates 632, 634 to be in only the extended or contracted positions, and not in any intermediate positions. When in one of the extended or contracted positions, the biasing mechanism 680 (e.g. spring) resists movement until sufficient force is applied, in which case the plates 632, 634 are moved into the other of the extended/contracted position.

Numerous spring configurations and arrangements may be used to provide desired biasing features. One important consideration in selecting, for example, a spring configuration is durability. In the case of mobile computing devices, usages can be heavy, and some consideration to making use of a durable spring or spring set as the biasing mechanism 680 is beneficial.

Figure 7A:
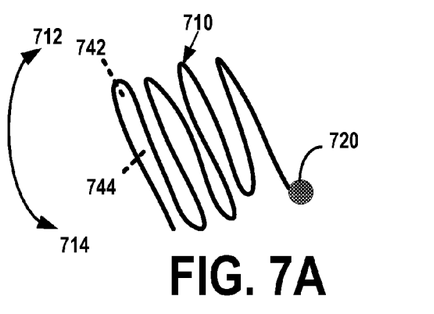
FIG. 7A illustrates a serpentine spring for use as a biasing mechanism of a slider assembly, under an embodiment.

FIG. 7A illustrates a spring configuration for use with one or more embodiments. With reference to FIG. 7A, a spring 710 is secured to an anchor 720 on one or both of the front and back plates 632, 634 (FIG. 6A and FIG. 6B) that comprise the slider assembly. In an embodiment of FIG. 7A, the spring 710 is a serpentine construction, capable of pivoting about anchor 710 while translating from the extended position 712 to the contracted position 714. The spring 710 may be provided on one of the front or back plates 632, 634 (FIG. 6A and FIG. 6B) to at least substantially (or partially) translate relative to another plate when the housing segments are moved between the extended and contracted positions. The end points of the spring's translation are shown by extended position 712 and contracted position 714.

The anchor 720 is positioned between the positions 712, 714 to cause the spring to be relatively relaxed when in either of the positions 712, 714, and flexed when being in between the positions. The configuration of the spring 710 is such that when the spring plates are pushed out of one of the contracted or extended positions 712, 714, the spring 710 is pushed or biased into moving into the other of the contracted/extended positions 712, 714. As the plates are pushed from one position to the other, an end of the spring translates and pivots about the anchor. When the sprint 710 is initiated towards the anchor, it biases, so to as push against the movement from the original position (contracted or extended). But the spring 710 quickly releases to bias the movement into the new contracted or extended position.

Figure 7B:
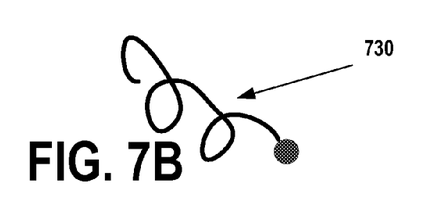
FIG. 7B illustrates a torsional spring for use as a biasing mechanism of a slider assembly, under an embodiment.

FIG. 7B shows another variation in which a torsional spring 730 may be used as a biasing mechanism, under an embodiment of the invention. The torsional spring 730 may be used similar to a manner described with the serpentine spring 710 of FIG. 7A.

Numerous other spring constructions may be employed in addition or as an alternative to specific spring configurations shown and described. For example, under one embodiment, multiple springs may be used to provide the biasing mechanism. For example, two torsional springs may combine to enable a bi-stable biasing mechanism such as described with one or more other embodiments.

Figure 7C:
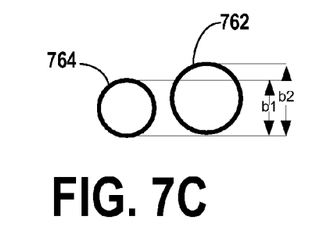
FIG. 7C illustrates a variable cross-section that may be provided on a section of a spring that forms a biasing mechanism for a slider assembly, under an embodiment.

With regard to any of the spring embodiments described, one or more embodiments provide for structural features in the spring to increase the longevity of lifespan of the springs. With reference to an embodiment of FIG. 7A, for example, the spring 710 may include a variable cross-section dimension, by which the spring is made thicker (and thus stronger) at points of high stress or strain. With reference to an embodiment of FIG. 7A, the spring 710 may include a point of high strain 742 and a point of low strain 744. In order to enhance the durability of lifespan of the spring 710, FIG. 7C illustrates an embodiment in which a cross section 762 of the point of high-strain 742 (as represented by the diameter b2) is larger than the cross section 764 of the point of low-strain 744 (as represented by the diameter b1). According to an embodiment, various cross-sectional dimensions may be used on a single spring in order to adjust the strength of the spring at selective locations in some relation to the amount of strain that the identified point may receive.

Figure 7D:
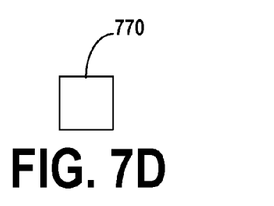
FIG. 7D illustrates an optional rectangular or square cross-section of a spring for a biasing mechanism, under an embodiment.

According to an embodiment of FIG. 7C, an overall cross section of the spring 710 (FIG. 7A) or 730 (FIG. 7B) may be made variable over the length of the spring in order to enhance the spring's longevity and performance over time. As an alternative or addition, FIG. 7D shows the spring 710 (or other spring) with a rectangular or square shaped cross-section 770. Such a cross-section inherently includes more material in the same dimension as its circular counterpart.

Figure 8:
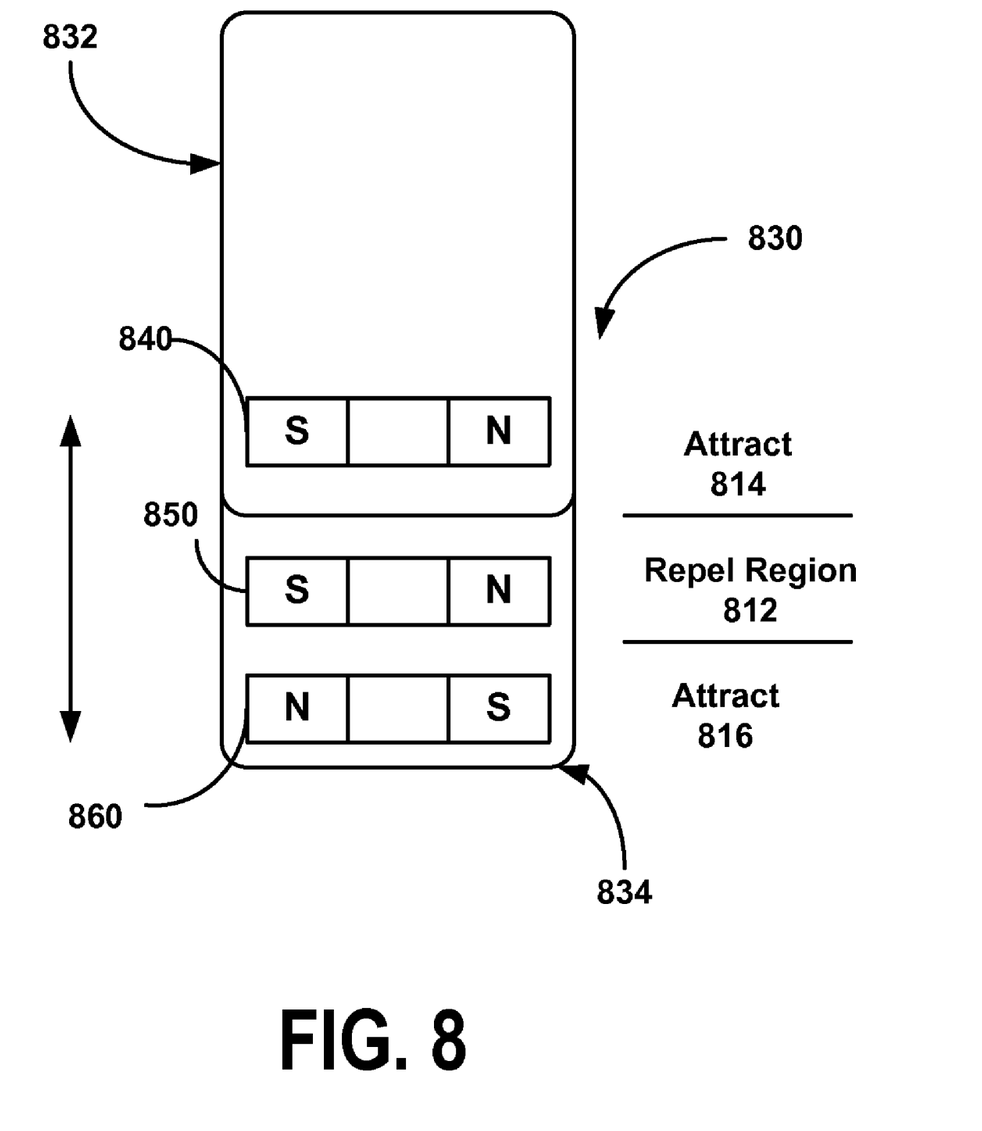
FIG. 8 illustrates a slider assembly that utilizes an arrangement of magnets for a biasing mechanism of a slider assembly, under an embodiment.

As an alternative to use of spring(s) for a biasing mechanism, one or more embodiments provide for use of magnets to facilitate movement of the plates (or corresponding housing segments) such as shown and described with any of the embodiments described above. FIG. 8 illustrates an embodiment in which a slider assembly includes magnets to create biases to maintain the housing segments of a device in a given position. In particular, a slider assembly 830 is shown including a front plate 832 and a back plate 834. As described with, for example, an embodiment of FIG. 1A and FIG. 1B, the plates 832, 834 that comprise the slider assembly 830 may be distributed into the respective front and back housing segments. The plates 832, 834 may be coupled using, for example, one or more combinations of a slot and securement feature, such as described with an embodiment of FIG. 2A-FIG. 2C.

Rather than use springs, an embodiment of FIG. 8 provides for a series or arrangement of magnets to bias the plates 832, 834 into being in either the contracted position or the extended position. When the plates are in an intermediate position, the plates may be biased into moving into one of the extended or contracted positions. In this way, the series or arrangement of magnets may simulate the use of springs.

According to an embodiment, a magnet 840 (or combination of magnets) may be provided with or integrated into the front plate 832, and a magnet 860 (or combination of magnets) may be provided with or integrated into the back plate 834. Each of the magnets 840, 860 may be provided as a single piece, or as a combination of pieces. A repulsion magnet combination 850 may be provided between the magnet(s) of the front plate 832 and of the back plate 834. The polarity and magnitude of the magnets may be used to create an attraction region 814 that corresponds to the contracted position, and another attraction region 816 that corresponds to the extended position. Additionally, the polarity and magnitude of the magnets 840, 860 may create repulsion region 812. The positioning of the magnets provides that the repulsion region 812 is positioned between the extended and contracted positions. When movement of one plate 832, 834 (and this housing segment 110, 150) is initiated to push one housing segment away from another, the repulsion region 812 may bias against the movement of the housing segments of device. Thus, the presence of the repulsion region 812 requires the user to place a measurable force to push the housing segments to and from the extended/contracted positions. In an embodiment, the user applies such a force to move the housing segments apart. When the force is greater than the repulsion force, the application of the force causes the housing segments to overcome the bias of the old position and receive a new bias to direct them towards the other of the two positions.

While an embodiment of FIG. 8 provides for magnets to be secured or otherwise integrated with the front and back plates 832, 834, an embodiment provides that at least some of the magnets used are provided in the housing, apart from the plates. Thus, an embodiment provides that some or all of the magnets shown in an embodiment of FIG. 8 are provided apart from the plates, and in the housing assembly 106 (FIG. 1A) of the computing device.

Plate Implementations

Figure 9A:
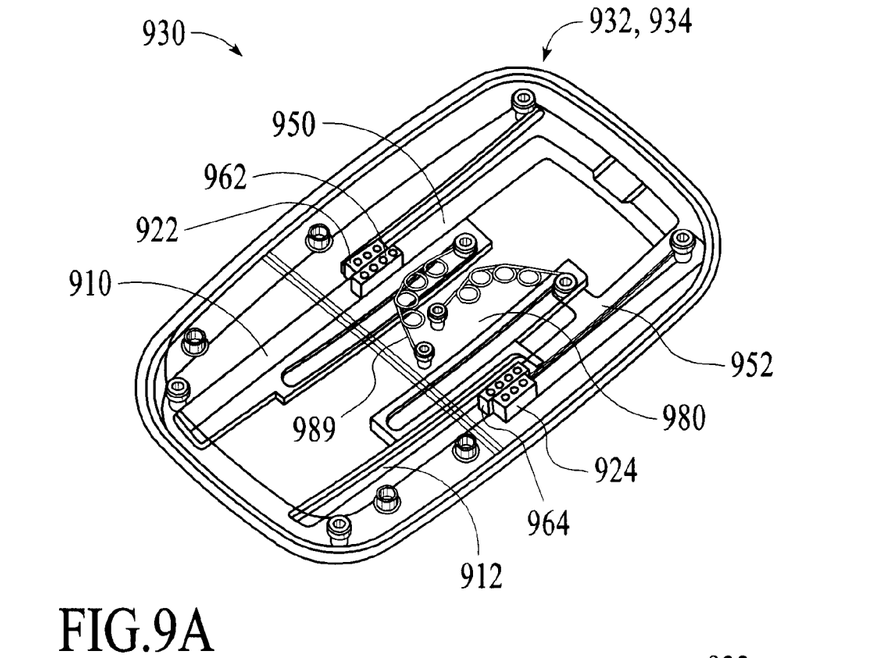
FIG. 9A is a front isometric view of a slider assembly in a contracted position, under an embodiment.
Figure 9B:
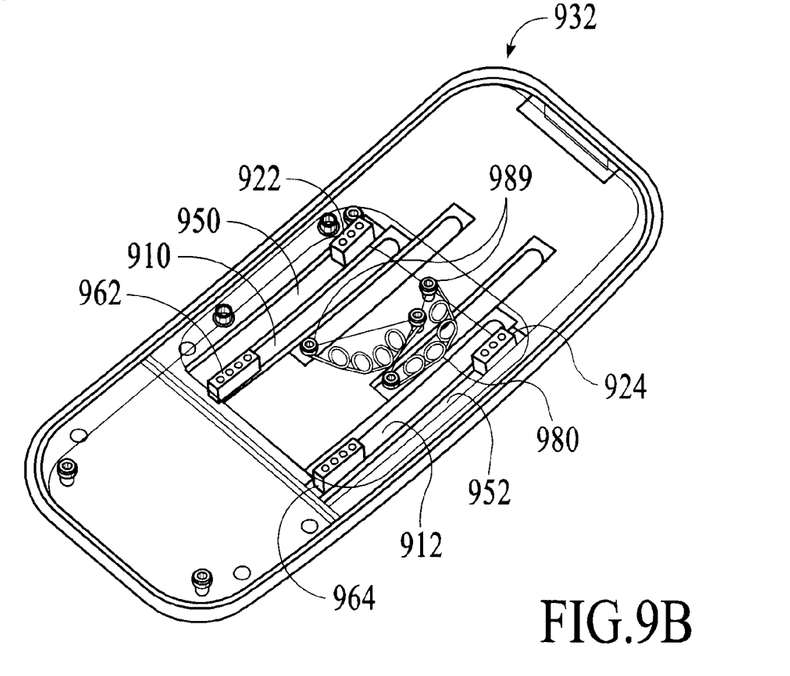
FIG. 9B is a front isometric view of a slider assembly in an extended position, under an embodiment of the invention.

FIG. 9A and FIG. 9B illustrate an alternative set of plates for use as a slider assembly, under an embodiment of the invention. As described with one or more other embodiments, the plates of the slide assembly may be integrated as layers into each of the housing segments that comprise the housing or housing assembly of a mobile computing device.

FIG. 9A is a front isometric view of a slider assembly 930 in a contracted position. The slider assembly 930 includes a front plate 932 that is combined with a back plate 934 to enable a sliding motion such as described with one or more embodiments provided above. In particular, front plate 932 includes slots 910, 912 and cleats 922, 924, while the back plate 934 includes slots 950, 952 and cleats 962, 964. The cleats 922, 924 of the front plate 932 engage and slide within the slots 950, 952 of the back plate 934, while the cleats 962, 964 of the back plate 934 engage and slide within the slots 910, 912 of the front plate 932.

As described with embodiments of FIG. 3A and FIG. 3B, FIG. 4A and FIG. 4B, and FIG. 5A and FIG. 5B, various slot configurations may be used. FIG. 9A and FIG. 9B is a front isometric view of the slot configuration in which slots are aligned end-on-end (i.e. vertical stagger) and side-by-side (horizontal stagger) when the housing segments are in the contracted position. In particular, FIG. 9A shows the implementation in which the front plate 932 and the back plate 934 are in the contracted position, and the slots 910, 912 of the front plate 932 are both vertically (i.e. in the general direction of the slide motion) and horizontally staggered with respect to the slots 950, 952 of the back plate 934. FIG. 9B illustrates the front plate 932 and the back plate 934 in the extended position. When the back plate 934 is moved into the extended position, the slots 910, 912 of the front plate 932 are primarily horizontally staggered. In the extended position, the vertical stagger may be partially or wholly removed by the housing segments being moved into the extended position.

As described with an embodiment of FIG. 6A and FIG. 6B, the slider assembly 930 includes a biasing mechanism in the form of a spring 980. The spring 980 is shown to have a serpentine configuration, although alternative implementations may use torsional springs, combination springs, or other spring configurations. As an alternative or addition, more than one spring 980 may be used. The spring 980 may bias the front plate 932 and the back plate 934 into remaining in the extended or contracted positions, as described with an embodiment of FIG. 6A and FIG. 6B.

With regard to FIG. 9A and FIG. 9B, the interface surfaces between the respective front and back plates 932, 934 may include various anchors 989 that serve to retain a spring 980 of a particular configuration. In an embodiment, the spring 980 is shaped to bias the two plates 932, 934 against moving out of either the contracted or extended position. Once, however, the two plates are moved out of either the extended or contracted position, the spring 980 is structured to bias the plates 932, 934 to move into the other of the extended or contracted position. The particular configuration and pattern of the spring 480 may vary, depending on desired properties, such as stiffness and durability.

With regard to embodiments such as shown in FIG. 9A-FIG. 9D, the front plate 932 and/or back plate 934 may be curved to facilitate a clam shell housing design and/or curvilinear sliding motion. As mentioned elsewhere, embodiments provide a slider assembly such as described above to enable a sliding motion amongst the housing segments that is arched, or otherwise includes a positive radius of curvature.

Alternatives

While some embodiments described above provide for use of four couplings (e.g. combination of slot and securement feature), other embodiments may use more or fewer couplings. For example, only one coupling may be used to enable the slider assembly.

While numerous embodiments described above provide for the slider assembly to have two primary positions, one or more embodiments provide for the slider mechanism to be structured to be moveable into at least one other position. In one embodiment, the slider assembly 130 may be used to position the device in any one of a first extended position, a contracted position, and a second extended position. Under one implementation, the housing segments 110, 150 (FIG. 1A) may be moved from the first extended position into the contracted position and then into the second extended position. In the second extended position, the back segment 150 (FIG. 1A) may include a front surface that becomes accessible for the user. As described with, for example, an embodiment of FIG. 1A and FIG. 1B, motion to the second extended position may be sliding and arched (positive radius of curvature). As another alternative, for example, the motion between the two housing segments to the extended position may be linear, while the motion to the first extended position is arched.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

The invention claimed is:

1. A mobile computing device comprising:
   a front housing segment having a front structure that is provided as part of an integrated layer of at least a portion of the front housing segment, the front structure including a first front slot and a first front securement feature;
   a back housing segment having a rear structure that is provided as part of an integrated layer of at least a portion of the back housing segment, the back structure including a first back slot and a first back securement feature;
   wherein the front structure and the back structure combine to form a slider assembly that includes (i) the first back securement feature being received and slideably engaged with the first front slot, and (ii) the first front securement feature being received and slideably engaged with the first back slot;
   wherein the slider assembly formed by the front structure and the back structure enable the front housing segment and the back housing segment to move between an extended position and a contracted position.

2. The mobile computing device of claim 1, wherein the front structure of the front housing segment is provided as part of the integrated layer that includes at least a portion of a back surface of the front housing segment that slides against the back housing segment.

3. The mobile computing device of claim 1, wherein the back structure of the back housing segment is provided as part of the integrated layer that includes at least a portion of a front surface of the back housing segment that slides against the back surface of the front housing segment.

4. The mobile computing device of claim 1, wherein the slider assembly enables the front housing segment and the back housing segment to move in an arc when moving between the extended position and the contracted position.

5. The mobile computing device of claim 4, wherein at least one of the front structure and the back structure corresponds to a plate that is fixed and secured to the respective front housing segment or the back housing segment.

6. The mobile computing device of claim 1, further comprising:
   the front structure of the front housing segment including a second front slot and a second front securement feature;
   the back structure of the back housing segment including a second back slot and a second back securement feature;
   wherein the front structure and the back structure are positioned so that the second back securement feature is received and slideably engaged with the second front slot, and the second front securement feature is received and slideably engaged with the second back securement feature.

7. The mobile computing device of claim 1, further comprising a biasing mechanism that is biased against the front housing segment being moved out of either the contracted position or the extended position.

8. The mobile computing device of claim 7, wherein the biasing mechanism corresponds to a spring structure.

9. The mobile computing device of claim 8, wherein the spring structure is bi-stable so that the front and back housing segments are biased into remaining in one of the extended or contracted positions, but not in between.

10. The mobile computing device of claim 8, wherein the spring structure includes a plurality of bends and a variable thickness in its cross-section.

11. The mobile computing device of claim 7, wherein the biasing mechanism includes one or more magnets positioned to attract the securement features into remaining in either of the contracted or extended positions.

12. A slider assembly for a computing device housing, the slider housing comprising:
   a front plate including at least a first front slot and at least a first front securement feature that extends from the front plate; and
   a back plate that is slideably coupled to the front plate by including (i) at least a first back slot that receives and is slideably engaged with the first front securement feature of the front plate, and (ii) at least a first back securement feature that is received and slideably engaged with the first front slot of the front plate;
   wherein the front plate is structured to integrate within a front housing segment of the computing device, and the back plate is structured to integrate within a back housing segment of the computing device, and wherein the front plate and the back plate are slideably coupled to one to another move between an extended position and a contracted position.

13. The slider assembly of claim 12, wherein each of the front plate and the back plate is integrated into the corresponding front or back housing segment by being either secured into or unitarily formed with that corresponding front or back housing segment.

14. The slider assembly of claim 12, further comprising a biasing mechanism that is coupled to the front plate and the back plate, wherein the mechanism is structured to bias against the front plate and the back plate being moved out of either the contracted position or the extended position.

15. The slider assembly of claim 14, wherein the biasing mechanism corresponds to one or more springs, and wherein each of the one or more springs is coupled to the front plate and the back plate.

16. The slider assembly of claim 14, wherein the biasing mechanism corresponds to an arrangement of magnets, including a magnet provided on each of the front plate and the back plate, wherein the arrangement of magnets provides magnetic attraction to bias the front plate and the back plate into remaining or moving into the contracted position and the extended position, and against moving in between the contracted or extended position.

17. The slider assembly of claim 12,
wherein the front plate includes at least a second front slot and at least a second front securement feature that extends from the front plate;
wherein the back plate is slideably coupled to the front plate by including (i) at least a second back slot that receives and is slideably engaged with the second front securement feature of the front plate, and (ii) at least a second back securement feature that is received and slideably engaged with the second front slot of the front plate.

18. A housing assembly for a computing device, the housing comprising:
a front housing segment;
a back housing segment; and
a slider assembly that includes:
a front plate including at least a first front slot and at least a first front securement feature that extends from the front plate; and
a back plate is slideably coupled to the front plate by including (i) at least a first back slot that receives and is slideably engaged with the first front securement feature of the front plate, and (ii) at least a first back securement feature that is received and slideably engaged with the first front slot of the front plate;
wherein the front plate is structured to integrate within the front housing segment, and the back plate is structured to integrate within the back housing of the back housing segment, so that the front housing segment and the back housing segment are slideably coupled to one another by the front plate and the back plate to move between at least an extended position and a contracted position.

19. The housing assembly of claim 18, wherein the front plate is secured into the front housing segment to extend at or adjacent to a back surface of the front housing segment, and wherein the back plate is secured into the back housing segment to extend at or adjacent to a front surface of the back housing segment.

20. The housing assembly of claim 18, further comprising a biasing mechanism that is coupled to the front plate and the back plate, wherein the biasing mechanism is structured to bias against the front plate and the back plate being moved out of either the contracted position or the extended position.

21. The housing assembly of claim 20, wherein the biasing mechanism includes one of (i) one or more springs, or (ii) an arrangement of magnets.

22. The housing assembly of claim 18, wherein the front housing segment and the back housing segment are slideably coupled to move along an arc when moving between the extended position and the contracted position.

* * * * *